United States Patent
Bland

[15] 3,681,345
[45] Aug. 1, 1972

[54] DYESTUFFS AND PHOTOGRAPHIC PROCESS

[72] Inventor: Stephen William Bland, Manchester, England

[73] Assignee: Imperial Chemical Industries Limited, London, England

[22] Filed: March 9, 1970

[21] Appl. No.: 17,981

[30] Foreign Application Priority Data

March 14, 1969 Great Britain..............13,577/69
May 22, 1969 Great Britain..............26,210/69
July 8, 1969 Great Britain..............34,416/69

[52] U.S. Cl...................260/240.2, 8/55, 8/DIG. 21, 96/131, 96/133, 96/135, 96/138, 260/37 P, 260/240.3, 260/240.4
[51] Int. Cl. ............................................C07d 99/02
[58] Field of Search..............260/240.2, 240.3, 240.4

[56] References Cited

OTHER PUBLICATIONS

Kuhn et al., Chem. Abstracts 61:3092c (1965).

*Primary Examiner*—Henry R. Jiles
*Assistant Examiner*—G. Thomas Todd
*Attorney*—Cushman, Darby and Cushman

[57] ABSTRACT

Methine dyes of the formula:

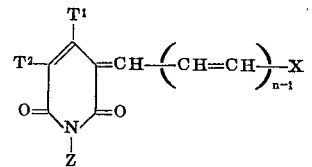

wherein X is $-E^1$ or $-CH = E^2$, $E^1$ being the residue of an compound containing a reactive methylene group, and $E^2$ the residue of a 5- or 6-membered nitrogen containing heterocyclic ring; $n$ is 1, 2 or 3, Z is hydrogen, or an optionally substituted amino or hydrocarbon radical; and $T^1$ and $T^2$ are each independently hydrogen, cyano, carbonamido, acyl or an optionally substituted hydrocarbon radical; and the use of the said dyestuffs for coloring textile materials or in photographic materials.

2 Claims, No Drawings

DYESTUFFS AND PHOTOGRAPHIC PROCESS

This invention relates to new dyestuffs and more particularly to new methine and polymethine dyestuffs.

According to the invention there are provided the dyestuffs which, in one of the possible tautomeric forms, are represented by the formula:

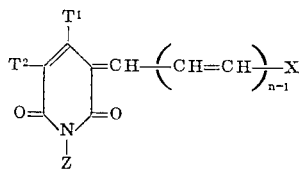

wherein X represents a group of the formula:
—$E^1$ or —CH = $E^2$, wherein $E^1$ is the residue of a compound which contains a reactive methylene (—$CH_2$ —) group and wherein the methine chain present in the dyestuffs is attached to the carbon atoms of the said methylene group;

$E^2$ is the residue of a 5- or 6-membered nitrogen containing heterocyclic ring, which optionally forms part of a fused ring system, and which contains a —C = N — or — C = C — C = N — group in the heterocyclic ring and the methine chain present in the dyestuffs is attached to a carbon atom which is in $\alpha$- or $\gamma$- position to the nitrogen atom of the said group;

$n$ is 1, 2 or 3;

Z represents a hydrogen atom or an optionally substituted alkyl, aralkyl, cycloalkyl, aryl or heterocyclic radical or an optionally substituted amino group;

$T^1$ represents a hydrogen atom or a hydroxy, — CN, — $COOR^1$, $CONR^1R^2$ or — $COR^1$ group or an optionally substituted alkyl, aralkyl, cycloalkyl, aryl or heterocyclic radical;

$T^2$ represents a hydrogen atom or a — CN, — $COOR^1$,— $CONR^1R^2$ or — $COR^1$ group or an optionally substituting alkyl, aralkyl, cycloalkyl, aryl or heterocyclic ring; and $R^1$ and $R^2$ each independently represent a hydrogen atom or an optionally substituted alkyl, aralkyl, cycloalkyl, aryl or heterocyclic radical or $R^1$ and $R^2$ together form with the nitrogen atom N a 5- or 6-membered nitrogen containing heterocyclic radical.

The dyestuffs of the invention can exist in a number of tautomeric forms; for convenience the dyestuffs have only been formulated in one of these tautomeric forms, but it is to be understood that this specification relates to dyestuffs in any of the possible tautomeric forms.

As examples of classes of compounds which contain a reactive methylene group or which contain a system which by virtue of enol-keto tautomerism can function as a reactive methylene group, and the residues of which are represented by $E^1$, there may be mentioned 5-pyrazolones, 5-aminopyrazoles, acylacetoarylamides, alkylcyanoacetates, alkyl acylacetates, malonodinitrile, dialkyl malonates, hydroxy pyridones of the formula:

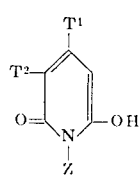

wherein $T^1$, $T^2$ and Z have the meanings stated above, or naphthols.

As examples of 5- or 6-membered nitrogen containing heterocyclic ring systems, the residues of which are represented by $E^2$, there may be mentioned oxazole, benzoxazole, thiazole and benzthiazole.

Throughout the specification the terms "lower alkyl" and "lower alkoxy" are used to denote alkyl and alkoxy radicals respectively containing from one to four carbon atoms.

The optionally substituted alkyl radicals represented by Z, $T^1$, $T^2$, $R^1$ and $R^2$ are preferably optionally substituted lower alkyl radicals, and as specific examples of such radicals there may be mentioned methyl, ethyl, n-propyl, n-butyl, n-octyl, n-decyl and n-dodecyl, hydroxy lower alkyl such as $\beta$-hydroxyethyl, lower alkoxy lower alkyl such as $\beta$-(methoxy or ethoxy) ethyl and $\gamma$-methoxypropyl, cyanomethyl, carbamoylmethyl, carbethoxymethyl and acetylmethyl.

As examples of aralkyl radicals represented by Z, $T^1$, $T^2$, $R^1$ and $R^2$ there may be mentioned benzyl and $\beta$-phenylethyl. As an example of a cycloalkyl radical represented by Z, $T^1$, $T^2$, $R^1$ and $R^2$ there may be mentioned cyclohexyl. The optionally substituted aryl radicals represented by Z, $T^1$, $T^2$, $R^1$ and $R^2$ are preferably optionally substituted phenyl radicals, and as specific examples of such radicals there may be mentioned phenyl, tolyl, chlorophenyl, methoxyphenyl and ethoxyphenyl. The optionally substituted heterocyclic radicals represented by Z, $T^1$, $T^2$, $R^1$ and $R^2$ are preferably optionally substituted 5- and 6-membered heterocyclic rings, and as specific examples of such radicals there may be mentioned 2-pyridyl, 2-thiazolyl, 1-piperidinyl and 1-morpholinyl.

As examples of 5- and 6-membered containing heterocyclic rings formed by joining $R^1$, $R^2$ and the nitrogen atom there may be mentioned piperidine, morpholine, piperazine and pyrrolidine.

According to a further feature of the invention there is provided a process for the manufacture of the dyestuffs as hereinbefore defined wherein X represents the group $E^1$, which comprises condensing an acetal of the formula:

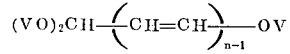

wherein $n$ has the meaning stated and each V represents a lower alkyl radical and can be the same or different, with one molecular proportion of a hydroxypyridone which, in one of the possible tautomeric forms, is represented by the formula:

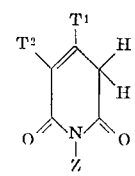

wherein $T^1$, $T^2$ and Z have the meanings stated, and with one molecular proportion of a compound of the formula: H — $E^1$ which contains a reactive methylene group or a system which by virtue of enol-keto tautomerisium can function as a reactive methylene group.

The process of the invention can be conveniently brought about by condensing the acetal with the hydroxypyridone and then condensing the resulting product with the compound of the formula H — E¹, the condensations being effected in an organic solvent such as ethanol and preferably in the presence of a base such as triethylamine or pyridine, and at a temperature between 20°C and the boiling point of the solvent. The resulting dyestuff can then be isolated by conventional methods, for example by removing some or all of the organic solvent or by adding a liquid such as water to reduce the solubility of the dyestuff in the organic solvent.

As examples of acetals which can be used in this process of the invention there may be mentioned β-ethoxy acrolein diethyl acetal, β-ethoxy acrolein dimethyl acetal and triethyl orthoformate.

The hydroxypyridones used in the process of the invention can themselves be obtained by a number of methods such as are described for example in "Heterocyclic Compounds—Pyridine and its derivatives—Part 3" which was edited by Klingsberg and published by Interscience Publishers in 1962. Typical methods include, for example, (1) condensing together compounds of the formula T¹COCH₂COO alkyl and T²CH₂COO alkyl in the presence of an excess of an amine of the formula Z — NH₂, (2) cyclisation of an α:β-disubstituted glutaconamide of the formula alkyl - OOC.

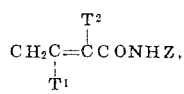

which is itself obtained by condensing together in the presence of a basic catalyst compounds of the formulae T¹COCH₂COO — alkyl and T²CH₂CONHZ, or (3) cyclisation of an α:β-disubstituted glutaconamide of the formula

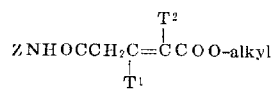

which is itself obtained by condensing together compounds of the formulae T¹COCH₂CONHZ and T²CH₂COO-alkyl.

As specific examples of the hydroxypyridones there may be mentioned 2:6-dihydroxypyridine, 2:6-dihydroxy-3-cyano-4-methylpyridine, 1-(methyl or ethyl)-3-cyano-4-methyl-6-hydroxypyrid-2-one, 1-(α-hydroxyethyl or γ-methoxy-propyl)-3-cyano-4-(methyl, phenyl or ethyl)-6-hydroxypyrid-2-one, 1-(phenyl, p-tolyl orp-anisyl)-3-cyano-4-(methyl or phenyl)-6-hydroxyprid-2-one, 1-phenyl-3-(carbonamido or carboethoxy)-4-(methyl or phenyl)-6-hydroxypyrid-2-one, 2:6-dihydroxy-3-(carbonamido, carboethoxy or carbodiethylamido)-4-methylpyridine, 2:6-dihydroxy-3- (carbonamido or carboethoxy)-pyridine, 2:6-dihydroxy-2-carbonamido-4-phenyl-pyridine, 2:6-dihydroxy-3-cyano-4-carbonamidopyridine, 2:6-dihydroxy-3-cyano-4-(carbomethoxy or carboethoxy)pyridine, ethyl 2:6-dihydroxy-3-cyanopyrid-4-ylacetate, 2:6-dihydroxy-3-cyanopyrid-4-ylacetamide, 2,6-dihydroxy-3:4-di(carboethoxy)-pyridine, 2:6-dihydroxy-3-carbonamido-4-carboethoxypyridine, 2:6-dihydroxy-4-methylpyridine, ethyl 2:6-dihydroxyisonicotinate, 2:6-dihydroxy isonicotinamide, 2.6-dihydroxy isonicotinic diethylamide, 2:6-dihydroxy-4-cyanopyridine, 2:6-dihydroxy-4-phenylpyridine, 2:6-dihydroxy-4-(p-hydroxyphenyl)pyridine, 2:6-dihydroxy-4-(p-methoxyphenyl) pyridine, 2:4:6-trihydroxypyridine and 2:6-dihydroxy-3-cyano-4-ethoxycarbonyl-methylpyridine.

As specific examples of compounds of the formula H—E¹ which can be used in the process of the invention there may be mentioned hydroxypyridones such as are described above, 5-pyrazolones such as 1:3-dimethyl-5-pyrazolone, 1-phenyl-3-(methyl or carboethoxy)-5-pyrazolone, 1-(o-, m- or p-tolyl)-3-methyl-5-pyrazolones and 1-phenyl-3-methyl-5-pyrazolones substituted in the phenyl ring by one or more substituents such as chlorine, bromine,nitro, methoxy, sulphonamido, trifluoromethyl or methyl-sulphonyl, 5-aminopyrazoles such as 1-phenyl-3-methyl-5-aminopyrazole, acylacetarylamides such as acetoacetanilide, alkyl cyanoacetates such as methyl cyanoacetate, alkyl acylacetates such as ethyl acetoacetate and methyl benzoylacetate, malonidinitrile, dialkyl malonates such as diethyl malonate, naphthols such as 1-naphthol, 5:8-dichloro-1-naphthol, 2-naphthol and 2-naphthol-6-sulphonamide, 1:3-indanedione and barbituric acid.

According to a further feature of the invention there is provided a process for the manufacture of the dyestuffs, as hereinbefore defined, wherein X represents the group of the formula —Ch = E² which comprises condensing an acetal as previously defined with one molecular proportion of a hydroxypyridone as previously defined and with one molecular proportion of a heterocyclic compound of the formula CH₃ — E³ wherein E³ is the residue of a 5- or 6-membered nitrogen containing heterocyclic ring, which optionally forms parts of a fused ring system, and which contains a —C = N— or —C = C — C = N— system or a quaternary ammonium derivative thereof, and the methyl group is attached to a carbon atom which is in α- or γ-position to the nitrogen atom of said system.

This process of the invention can be conveniently carried out by stirring the reactants together in an organic solvent such as ethanol, preferably in the presence of an organic base such as triethylamine, the reaction being carried out at a temperature between 20°C and the boiling point of the reaction medium. The resulting dyestuff can then be isolated by conventional methods.

As specific examples of the compounds of the formula CH₃ — E³ there may be mentioned 2- and 4-methylpicoline, 2- and 4-methylquinoline, 2- and 4-methyl-N-methyl-pyridinium chloride, 2-methylbenzoxazole, 2-methylbenzthiazole and 6-(chloro-, methoxy- or methyl- )-2-methyl-(benzthiazole or benzoxazole).

According to a further feature of the invention there is provided a process for the manufacture of the dyestuffs as hereinbefore defined wherein n is 3 and X represents an —E¹ group, which comprises condensing an aldehyde of the formula:

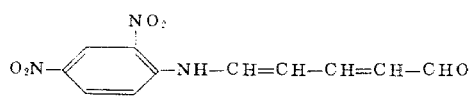

with one molecular proportion of a hydroxypyridone as hereinbefore defined and with one molecular proportion of a compound of the formula H — E¹ as hereinbefore defined.

This process of the invention can be conveniently carried out by stirring the reactants together in a basic organic liquid such as pyridine, preferably at a temperature between 20°C and the boiling point of the reaction medium. The resulting dyestuff can then be isolated by conventional methods. If desired this process can be carried out in two distinct stages; the condensation product of the aldehyde and the hydroxypyridone being isolated and then subsequently reacted with the compound of the formula H — E¹.

The aldehyde used in this process of the invention can itself be obtained by treating dinitrophenyl pyridinium chloride with an aqueous solution of sodium carbonate.

According to a further feature of the invention there is provided an alternative process for the manufacture of the dyestuffs of the invention wherein X is a hydroxypyridone radical which comprises reacting a dianil of the formula:

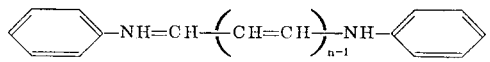

or a salt thereof with an acid, with two molecular proportions of a hydroxypyridone of the formula:

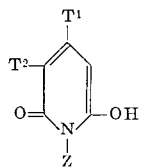

wherein $T^1$, $T^2$, Z and $n$ have the meanings stated above.

This process of the invention can be conveniently carried out by stirring the reactants together in an organic solvent, such as acetic anhydride, preferably at a temperature between 50°C and the boiling point of the reaction medium, and, if desired, in the presence of a base such as triethylamine or pyridine. The resulting dyestuff can then be isolated by conventional methods, for example by cooling the reaction mixture and filtering off the dyestuff which is precipitated.

As examples of the said dianils and salts thereof which can be used in the process of the invention there may be mentioned β-anilino acrolein anil hydrochloride, glutaconic aldehyde dianilide hydrochloride, and diphenyl formamidine.

According to a further feature of the invention there is provided an alternative process for the manufacture of the dyestuffs of the invention wherein $n$ is 2 and X is a hydroxypyridone radical which comprises reacting a 1:1:3:3-tetra(lower alkoxy)propane with two molecular proportions of a hydroxypyridone of the formula:

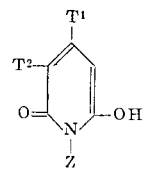

wherein $T^1$, $T^2$ and Z have the meanings stated above.

This process of the invention can be conveniently carried out by stirring the reactants together in an organic solvent such as β-ethoxyethanol, preferably at a temperature between 20°C and the boiling point of the reaction mixture, and preferably in the presence of an organic base such as triethylamine or pyridine. The resulting dyestuff can then be isolated by conventional methods for example by removing some or all of the organic solvent or by adding a liquid such as water, and filtering off the precipitated dyestuff.

As specific example of the 1:1:3:3-tetra(lower alkoxy) propanes which can be used in this process there may be mentioned 1:1:3:3-tetra(methoxy or ethoxy)-n-propane.

According to a further feature of the invention there is provided a process for the manufacture of the dyestuffs of the invention which comprises reacting a hydroxypyridone of the formula

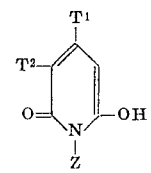

with an aniline compound of the formula:

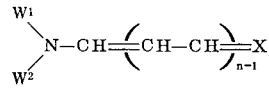

wherein $T^1$, $T^2$, Z, X and $n$ have the meanings stated above, $W^1$ is an optionally substituted phenyl radical and $W^2$ is a hydrogen atom or an acyl radical.

This process of the invention can be conveniently carried out by stirring the reactants together in an organic solvent, such as pyridine, preferably at a temperature between 20°C and the boiling point of the reaction medium, and, if desired, in the presence of a base such as triethylamine or pyridine. The resulting dyestuff can then be isolated by conventional methods.

The anilino compounds of the above formula can themselves be obtained by reacting a dianil as previously defined with a compound of the formula XH₂ in methanol or acetic anhydride in the presence of a base, and, if necessary, subsequently acylating to introduce the acyl radical represented by $W^2$.

As specific examples of anilino compounds of the above formula which can be used in this process there may be mentioned 1-phenyl-3-methyl-4-glutaconylanil-5-pyrazolone, 1-phenyl-3-methyl-4 { [3'-(N-phenyl-N-acetyl)amino]allydiene } 5-pyrazolone and N-[4'-(2''benzoxazolylethiodide)]butadienyl acetanilide.

One preferred class of the dyestuffs of the invention comprises the dyestuffs wherein $n$ is 2 or 3.

A second preferred class of the dyestuffs of the invention comprises the dyestuffs wherein $T^1$ is lower alkyl, preferably methyl, $T^2$ is hydrogen, cyano, carbonamido or carbo lower alkoxy, and Z is an optionally substituted lower alkyl or phenyl radical.

The dyestuffs of the invention are valuable for coloring textile materials and plastic masses by the methods commonly employed for coloring such materials and masses. In the case of those dyestuffs which are insoluble in water, the dyestuffs are preferably used in the form of aqueous dispersions which are obtained by milling the dyestuffs in water, preferably in the presence of a dispersing agent.

The dyestuffs of the invention are particularly valuable as tinting or sighting colors for nylon textile materials especially nylon fibers or filaments. Such colors are chiefly of value for identification of nylon textiles, the dyestuffs being readily removed or discharged in the processing baths to which such textile materials are subjected during normal dyeing or printing processes.

The dyestuffs of the invention are particularly valuable in photographic methods.

The use of dyes in gelatin or gelatino silver halide emulsion layers of photographic materials is well known to correct for various inherent deficiencies of photographic material. Such deficiencies are for example:

a. the U.V. sensitivity of most silver halide layers (which however can be corrected by the U.V. absorbing filters on the camera lens),
b. in conventional order multilayer color camera material, the blue sensitivity of the green and red sensitive layers,
c. progressive scatter of light by the silver halide grains leading to unsharpness (loss of acutance),
d. reflection of light at the emulsion-base, base-air interfaces (halation),
e. multilayer color material out of speed balance,
f. non-ideal spectral sensitivity.

Such dyestuffs may be called filter, antihalation, screening, layer balancing or acutance dyestuffs, depending on their function. They all act by adsborbing light to which a particular silver halide emulsion is sensitive, and they can be multifunctional. Dyestuffs of this type may be divided into two classes:

1. those which are non-diffusible and which therefore may be located in a particular gel or silver halide emulsion layer or layers,
2. those which are freely diffusible.

What ever the function of the dyestuff or its class, it must satisfy the following requirements:

a. the dyestuffs must have the correct selective spectral absorption for the function to the performed
b. the dyestuffs must be photographic inert, i.e. have no chemical desensitising or fogging action,
c. in the case of photographic material for viewing as a transparency, the dyestuff must be completely removable at some stage in the processing procedure. The removal can be by destruction of the colored chromophore of a non-diffusible dyestuff, or by washing out of a soluble diffusible dyestuff which preferably is accompanied by decolorisation, otherwise baths can become undesirably colored.

According to a further feature of the present invention there is provided a photographic material which contains in at least one layer thereof a dyestuff as hereinbefore defined.

The dyestuffs can be incorporated into the layer, which can be a gelatin layer or a gelatino-silver halide emulsion layer, by any of the conventional methods for introducing dyestuffs into such layers.

The presence of the said dyestuff or dyestuffs in at least one layer of the photographic material helps to correct a number of the inherent deficiencies of silver halide photographic material as hereinbefore set forth. The dyestuffs of use in the present invention are all of the gelatin substantive type and when they are incorporated into a gelatin or gelatino silver halide emulsion layer they remain in that layer and do not diffuse into adjacent layers. The dyestuffs of use in the present invention can be decolorized by photographic processing solutions which contain sulphite, e.g. most silver halide developing solutions and some fixing solutions.

The invention is illustrated but not limited by the following examples in which the parts and percentages are by weight.

EXAMPLE 1

A mixture of 1 part of β-ethoxy acrolein diethyl acetal, 2 parts of N-ethyl-2-hydroxy-4-methyl-5-cyanopyrid-6-one and 16 parts of ethanol is heated to the boil and 1.3 parts of triethylamine are added. The mixture is stirred for 2 minutes at the boil, then cooled to 0°C, and the precipitated dyestuff which, in one of the possible tautomeric forms, is represented by the formula:

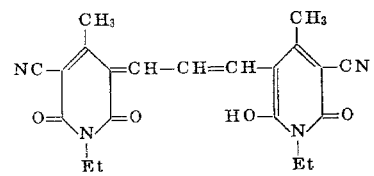

is filtered off, washed with cold ethanol and dried. The yield of the product is 1.6 parts.

When applied to wool and nylon textile materials from a dyebath containing acetic acid, the dyestuff yields bright reddish-blue shades.

EXAMPLE 2

A mixture of 3.0 parts of triethyl orthoformate, 7.2 parts of N-ethyl-2-hydroxy-4-methyl-5-cyanopyrid-6-one and 24 parts of pyridine is stirred for 2 hours at the boil, under a reflux condenser. The mixture is cooled to 0°C and the precipitated dyestuff, which in one of the possible tautomeric forms, is represented by the formula

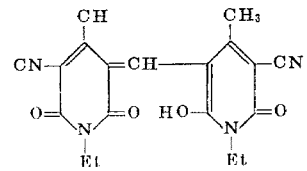

is filtered off, washed with cold pyridine, then with ether and is finally dried. The yield of product is 3.8 parts.

EXAMPLE 3

A mixture of 1.8 parts of β-ethoxyacrolein diethyl acetal, 4.4 parts of N-(γ-methoxypropyl)-2-hydroxy-4-methyl-5-cyanopyrid-6-one and 19 parts of pyridine is stirred at 20°C for 5 minutes. The precipitated dyestuff, which one of the possible tautomeric forms, is represented by the formula

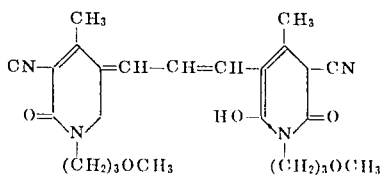

is then filtered off, washed with cold pyridine, then with ether and is finally dried. The yield of product is 2.6 parts.

EXAMPLE 4

A mixture of 3.6 parts of N-ethyl-2-hydroxy-4-methyl-5-cyanopyrid-6-one, 2.6 parts of N-(penta-1'3'-diene-5'-al)-2:4-dinitroaniline and 19 parts pyridine is heated at the boil for 15 minutes. The mixture is then cooled to 5°C, the precipitated dyestuff which can be represented by the formula

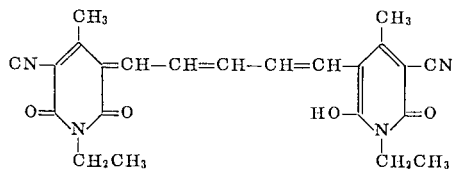

is filtered off, washed with pyridine, then with ether and is finally dried. The yield of product is 3.8 parts.

EXAMPLE 5

A mixture of 0.87 parts of 1-phenyl-3-methyl-pyrazol-5-one, 2.1 parts of N-ethyl-3-cyano-4-methyl-5-glutaconyl-(2':4'-dinitro)anilpyrid-2:6-dione, and 16 parts ethanol is heated to the boil. 0.6 part of triethylamine is added and the mixture stirred at the boil for 30 minutes. The mixture is then filtered, and the filtrate is added to 300 parts of water stirred at 20°C. The solution is then acidified with a dilute aqueous solution of hydrochloric acid to precipitate a dyestuff which, in one of the possible tautomeric forms, is represented by the formula:

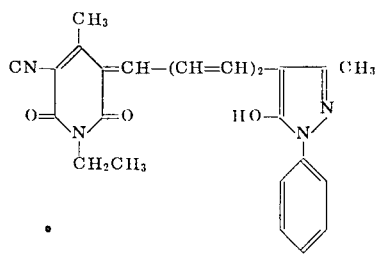

The precipitated dyestuff is then filtered off, washed acid with water, and is finally dried. The yield of product is 2.5 parts.

The pyridine derivative used in the above Example was itself obtained as follows:

A mixture of 7.12 parts of N-ethyl-2-hydroxy-3-cyano-4-methylpyrid-6-one, 10.52 parts of N-(penta-1'-3'-diene-5'-al)- 2:4-dinitroaniline and 140 parts of β-ethoxyethanol was stirred at the boil under a reflux condenser for 10 minutes. The mixture was then cooled to 15°C when the product of the formula:

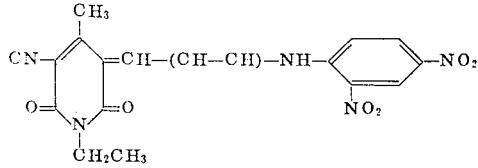

was precipitated. The solid was filtered off, washed with β-ethoxyethanol followed by ethanol and was then dried. The yield was 3.2 parts.

EXAMPLE 6

A mixture of 3.6 parts of N-ethyl-2-hydroxy-4-methyl-5-cyanopyrid-6-one, 2.6 parts of β-anilino acrolein anil hydrochloride and 19 parts of acetic anhydride is heated to the boiling point, 3.6 parts of triethylamine are added, and the mixture is stirred for 10 minutes at the boil under a reflux condenser. The mixture is cooled to 5°C., and the product which separates out is filtered off, washed with ethanol and dried. There are obtained 1.4 parts of the compound of the formula:

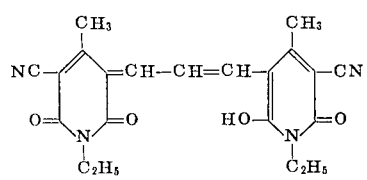

EXAMPLE 7

A mixture of 2.85 parts of glutaconic dialdehyde dianil hydrochloride, 3.6 parts of N-ethyl-2-hydroxy-4methyl-5-cyanopyrid-6-one and 28 parts of acetic anhydride is heated to 100°C, 3.6 parts of triethylamine are added, and the mixture heated for 10 minutes at 100°C. The mixture is then cooled to 0°C. and the product which separates out is filtered off, washed with acetic anhydride and then with ethanol and is finally dried. There are obtained 2.6 parts of the compound of the formula:

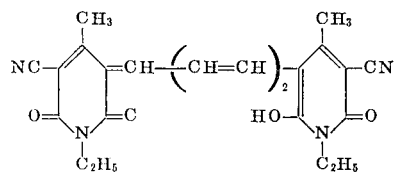

EXAMPLE 8

A mixture of 3.4 parts of 1-phenyl-3-methyl-4-{[3'-(N-phenyl-N-acetyl)amino]allyidene}-5-pyrazolone, 1.78 parts of N-ethyl-2-hydroxy-4-methyl-5-cyanopyrid-6-one and 49 parts of pyridine is stirred for 10 minutes at the boil under a reflux condenser. The mixture is cooled to 20°C, poured into 600 parts of a 2N aqueous solution of hydrochloric acid and the precipitated solid is filtered off, washed with water and dried.

There are obtained 3.8 parts of the compound of the formula:

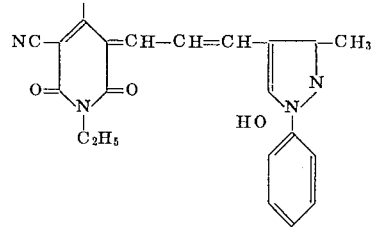

When applied to polyamide textile materials from an aqueous dyebath the dyestuff of this example yields rubine shades.

EXAMPLE 9

A mixture of 1.64 parts of 1:1:3:3-tetramethoxypropane, 3.6 parts of N-ethyl-2-hydroxy-4-methyl-5-cyanopyrid-6-one, 5 parts of pyridine and 37 parts of β-ethoxyethanol is stirred for 10 minutes at the boil under a reflux condenser. The mixture is cooled to 0°C, and the precipitated blue dyestuff is filtered off, washed with ether and dried. The resulting dyestuff is of the formula:

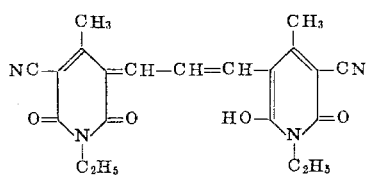

EXAMPLE 10

When the 3.6 parts of N-ethyl-2-hydroxy-4-methyl-5-cyanopyrid-6-one used in example 4 are replaced by 3.9 parts of N-(β-hydroxyethyl)-2-hydroxy-4-methyl-5-cyanopyrid-6-one the corresponding dyestuff is obtained having a β-hydroxyethyl group attached to the nitrogen atom of each pyridine ring.

EXAMPLE 11

0.2 gm of the dyestuff of example 1 is dissolved in water (50 ml.) at 20°C with stirring, the solution is screened and added to a stirred solution of 10 percent gelatin (30 ml.). The total volume of the solution is adjusted to 95 ml. 1 ml. of a 10 percent methanolic solution of dioctyl sodium sulphosuccinate is added, the pH of the gelatin solution is adjusted to pH 6 and the solution is diluted to give a total volume of 100 ml.

The solution is coated on a suitable support and the coating is dried. The absorption spectrum of the coating has a λmax of 525 μ with a subsidiary peak of 604 μ. The width of the absorption spectrum of the dye at half maximum density is 140 μ.

When the dyestuff of example 3 is similarly incorporated into a coated gelatine layer the maximum absorption is at 545 μ with a subsidiary peak at 604 μ. The width of the absorption spectra of the dye at half maximum density is 130 μ.

When the dyestuff of example 10 is similarly incorporated into a coated gelatine layer the maximum absorptions are at 540 and 602 μ, and the absorption at half the maximum density is from 490 to over 700 μ.

When the above coatings are subjected to a wide variety of normal photographic processing procedures the dyestuffs are rendered substantially colorless. Thus, for example, the dyestuffs are rendered substantially colorless by baths having the following compositions:

Black and White Developing Bath (pH of 10.1)
Calgon (10% solution) tg 40 mls
Phenidone 0.6 g.
Sodium Sulphite (anhyd) 50 g.
Hydroquinone 6.0 g.
Sodium Metaborate 36 g.
Potassium Bromide 2.0 g.
Potassium Thiocyanate (10%solution) 15 mls.
Benztriazole (1.1 solution) 20 mls.
Potassium Iodide (0.1%solution) 10 mls.
Demineralised water to 1000 g.
Fixing Bath (pH of 9.0)
Sodium Thiosulphate 175 g.
Sodium Sulphite (anhyd) 10 g.
Demineralized water to 1000 g.
coloring Developing Bath (pH of 12.0)
Trisodium Phosphate 80 g.
Hydroxylamine sulphate 2.4 g.
Sodium Sulphite (anhyd) 4.0 g.
Potassium Bromide 1.0 g.
N-Ethyl-N- 6.7 g.
(β-hydroxy) ethyl
p-phenylene
diamine sulphate
Potassium Iodide (0.1%solution) 5.0 mls.
Demineralized water to -b 1000 g.

EXAMPLE 12

By replacing the 7.2 parts of the pyridone used in example 2 by 6.0 parts of 2:6-dihydroxy-4-methyl-5-cyanopyridine the corresponding dyestuff is obtained wherein the nitrogen atom of each pyridine ring carries a hydrogen atom.

EXAMPLE 13

By replacing the 2 parts of the pyridone used in example 1 by 1.8 parts of 2:6-dihydroxy-4-methyl-5-cyanopyridine the corresponding dyestuff is obtained wherein the nitrogen atom of each pyridine ring carries a hydrogen atom.

When applied to nylon textile materials from an aqueous dyebath containing acetic acid bright reddish-blue shades are obtained.

EXAMPLE 14

By replacing the 4.4 parts of the pyridone used in example 3 by 4.1 parts of N-(β-hydroxyethyl)-2-hydroxy-4-methyl-5-cyanopyrid-6-one the corresponding dyestuff is obtained wherein the nitrogen atom of each pyridine ring carries a β-hydroxyethyl radical.

A coated gelatine layer containing the dyestuff has an sbsorption maximum at 508 μ and a subsidiary peak at 601 μ.

EXAMPLE 15

By replacing the 4.4 parts of the pyridone used in example 3 by 4.6 parts of N-phenyl-2-hydroxy-4-methyl-5-cyanopyrid-6-one and heating the mixture for 5 minutes at 50°C the corresponding dyestuff is obtained wherein the nitrogen atom of each pyridine ring carries a phenyl radical.

A coated gelatine layer containing the dyestuff has an absorption maxima at 609 μ. The dyestuff dyes nylon textile materials in bright reddish-blue shades.

EXAMPLE 16

By replacing the 3.6 parts of the pyridone used in example 6 by 4.1 parts of N-n-butyl-2-hydroxy-4-methyl-5-cyanopyrid-6-one the corresponding dyestuff is obtained wherein the nitrogen atom of each pyridine ring carries a n-butyl radical.

A coated gelatine layer containing the dyestuff has an absorption maximum at 604 μ and a subsidiary peak at 553 μ.

EXAMPLE 17

A mixture of 5 parts of N-cyclohexyl-2-hydroxy-4-methyl-5-cyanopyrid-6-one, 1.8 parts of β-ethoxyacrolein diethylacetal, 150 parts of chloroform and 3.8 parts of pyridine is stirred for 6 hours at 20°C. The precipitated dyestuff which, in one of the possible tautomeric forms, is represented by the formula:

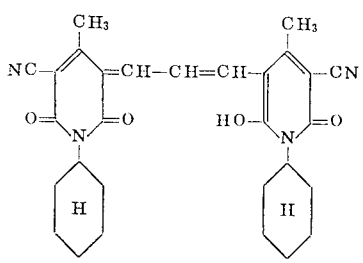

is filtered off, washed with chloroform and dried. The dyestuff dyes nylon textile materials in reddish-blue shades.

EXAMPLE 18

A mixture of 5.5 parts of N-n-nonyl-2-hydroxy-4-methyl-5-cyanopyrid-6one, 1.8 parts of β-ethoxyacrolein diethylacetal, 75 parts of chloroform and 3.5 parts of pyridine is stirred for 30 minutes at 20°C. The precipitated dyestuff, which corresponds to the dyestuff of example 17 except that each cyclohexyl radical is replaced by a n-nonyl radical, is then filtered off, washed with chloroform and dried.

The dyestuff dyes nylon textile materials in reddish-blue shades.

EXAMPLE 19

A mixture of 4.8 parts of N-benzyl-2-hydroxy-4-methyl-5-cyanopyrid-6-one, 2.95 parts of β-ethoxyacrolein diethylacetal, 37 parts of chloroform and 0.8 part of pyridine is stirred for 1 hour at 20°C. The precipitated dyestuff, which corresponds to the dyestuff of example 17 except that each cyclohexyl radical is replaced by a benzyl radical is then filtered off, washed with chloroform and dried.

The dyestuff dyes nylon textile materials from an aqueous dyebath containing acetic acid in rubine shades.

EXAMPLE 20

In place of the 4.8 parts of the pyridone used in example 19 there are used 5.7 parts of N-(m-carbomethoxyphenyl)-2-hydroxy-4-methyl-5-cyanopyrid-6-one whereby there is obtained the dyestuff which corresponds to the dyestuff of example 17 except that each cyclohexyl radical is replaced by the m-carbomethoxyphenyl radical.

The dyestuff dyes nylon textile materials from an aqueous dyebath containing acetic acid in reddish-blue shades.

A coated gelatine layer containing the dyestuff has an absorption maxima at 639 μ and a subsidiary peak at 507 μ.

EXAMPLE 21

A mixture of 4.0 parts of N-ethyl-2-hydroxy-4-methyl-5-carbonamidopyrid-6-one, 19 parts of pyridine and 3 parts of β-ethoxyacrolein diethyl acetal is stirred for 1 hour at 20°C. 80 parts of chloroform are then added, and the precipitated dyestuff, which in one of the possible tautomeric forms is of the formula:

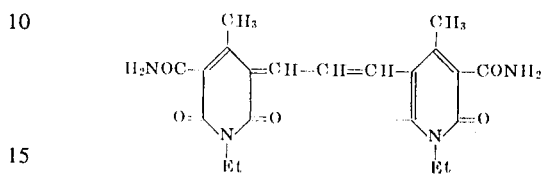

is filtered off, washed with chloroform and dried.

The dyestuff dyes nylon textile materials from an aqueous dyebath containing acetic acid in reddish-blue shades.

A coated gelatine layer containing the dyestuff has an absorption maxima at 601 μ and a subsidiary peak at 561 μ.

EXAMPLE 22

A mixture of 2.3 parts of N-ethyl-2-hydroxy-4-(p-methoxyphenyl)-5-cyanopyrid-6-one, 0.75 part of β-ethoxyacrolein diethylacetal and 7 parts of pyridine is stirred for 16 hours at 20°C. The precipitated dyestuff, which in one of the possible tautomeric forms is of the formula:

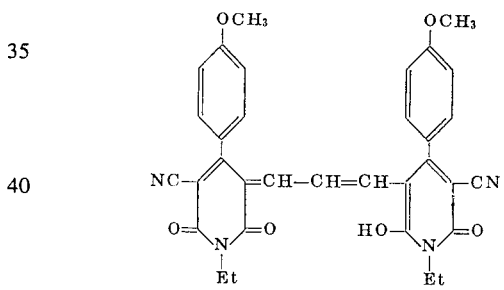

is then filtered off, washed with ether, and dried.

When applied to nylon textile materials from an aqueous dyebath containing acetic acid reddish-blue shades are obtained.

A coated gelatine layer containing the dyestuff has an obsorption maxima at 605 μ and a subsidiary peak at 559 μ.

EXAMPLE 23

A mixture of 6.2 parts of 2:6-dihydroxy-4-carboxypyridine, 3.6 parts of β-ethoxyacrolein diethylacetal and 15 parts of pyridine is stirred for 30 minutes at 100°C. The mixture is cooled to 20°C, and the precipitated dyestuff, which in one of the possible tautomeric forms is of the formula:

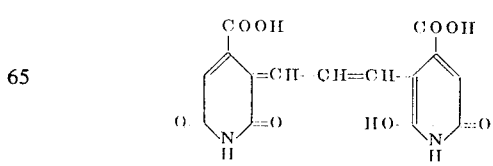

is filtered off, washed with ether and dried.

When applied to nylon textile from an aqueous dyebath containing acetic acid reddish blue shades are obtained.

A coated gelatine layer containing the dyestuff has an absorption maxima at 598 μ.

EXAMPLE 24

In place of the 6.2 parts of the pyridine compound used in example 23 there are used 6.1 parts of N-ethyl-2-hydroxy-4-methylpyrid-6-one whereby there is obtained the corresponding dyestuff having a methyl radical instead of a carboxy group attached to the 4-position of the pyridine ring and an ethyl radical attached to the nitrogen atom of each pyridine ring.

When applied to nylon textile materials from an aqueous dyebath containing acetic acid greyish-blue shades are obtained.

EXAMPLE 25

A mixture of 2.32 parts of N-cyclohexyl-2-hydroxy-4-methyl-5-cyanopyrid-2-one, 3.49 parts of N-ethyl-2-hydroxy-3-{[3'-(N-phenyl-N-acetyl)amino]allyidene}-4-methyl-5-cyanopyrid-6-one and 40 parts of acetic anhydride is heated to the boil, 2.1 parts of triethylamine are added, and the mixture stirred at the boil under a reflux condenser for 15 minutes. The mixture is cooled to 20°C, poured into 500 parts of water and the precipitated dyestuff, which in one of the possible tautomeric forms is of the formula:

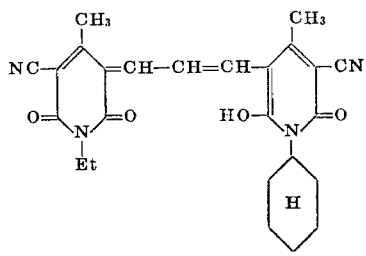

is filtered off and dried. The dyestuff is subsequently purified by crystallization from a chloroform/carbon tetrachloride mixture and then from butanol.

The dyestuff gives reddish-blue shades when applied to nylon textile materials.

The N-ethylpyridone derivative used in the above example was obtained by heating a mixture of 12 parts of N-ethyl-2-hydroxy-4-methyl-5-cyanopyrid-6-one, 25.8 parts of β-anilinoacrolein anil hydrochloride and 100 parts of acetic anhydride to the boiling point, cooling and filtering off the solid which separated out.

EXAMPLE 26

In place of the 2.32 parts of the N-cyclohexyl pyridine used in example 25 there are used 3.49 parts of N-n-dodecyl-2-hydroxy-4-methyl-5-carbonamidopyrid-6-one whereby there is obtained the dyestuff which in one of the possible tautomeric forms is of the formula:

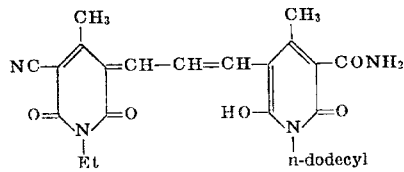

When applied to nylon textile materials from an aqueous dyebath containing acetic acid reddish-blue shades are obtained.

EXAMPLE 27

A mixture of 3.5 parts of N-ethyl-2-hydroxy-3{[3'-(N-phenyl-N-acetyl)amino]allyidene}-4-methyl-5-cyanopyrid-2-one, 1.7 parts of 1-phenyl-3-hydroxypyrazol-5-one and 20 parts of acetic anhydride is heated to the boil, 1.0 part of triethylamine is added, and the mixture stirred at the boil under a reflux condenser for 10 minutes. The mixture is then cooled to 10°C, filtered and the filtrate is poured into 70 parts of diethylether. The precipitated solid is filtered off, washed with diethyl ether, extracted with hot acetic acid, then washed with diethyl ether and finally dried. The resulting dyestuff in one of the possible tautomeric forms is of the formula:

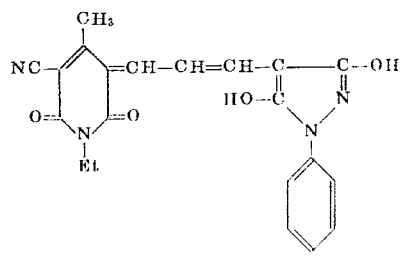

A coated gelatine layer containing the dyestuff has an absorption maxima at 502 μ and a subsidiary peak at 546 μ.

EXAMPLE 28

A mixture of 3.5 parts of N-ethyl-2-hydroxy-3-{[3'-(N-phenyl-N-acetyl)amino]allyidene}-4-methyl-5-cyanopyrid-6-one, 1.6 parts of 2,4-dihydroxyquinoline, 16 parts of ethanol and 2.5 parts of triethylamine is stirred for 16 hours at 20°C. The mixture is poured into 400 parts of water which is then acidified to Congo Red with hydrochloric acid, and the precipitated dyestuff is filtered off, washed with water and dried. The dyestuff is purified by extraction with hot ethanol.

The dyestuff in one of the possible tautomeric forms is of the formula:

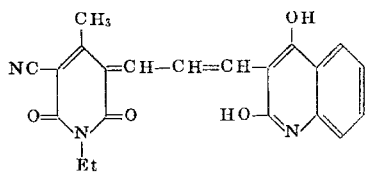

The dyestuff dyes nylon textile materials from an aqueous dyebath containing acetic acid in rubine shades.

EXAMPLE 29

By replacing the 3.6 parts of the pyridone used in example 4 by 4.4 parts of N-(γ-methoxypropyl)-2-hydroxy-4-methyl-5-cyanopyrid-6-one or by 3.9 parts of N-(β-hydroxyethyl)-2-hydroxy-4-methyl-5-cyanopyrid-6-one the corresponding are obtained wherein the ethyl radical attached to the nitrogen atom of each pyridine ring is replace by the γ-methoxypropyl and β-hydroxyethyl radicals respectively.

The dyestuffs dye nylon textile materials in blue and reddish-blue shades respectively.

Coated gelatine layers containing these dyestuffs have absorption maxima at 600 μ and 540 μ respectively.

EXAMPLE 30

A mixture of 1.8 parts of N-ethyl-2-hydroxy-4-methyl-5-cyanopyrid-6-one, 4.34 parts of 2-(2'-N-acetanilidoethylidene) benzoxazole ethiodide and 30 parts of acetic anhydride is stirred at 20°C and 2.5 parts of triethylamine are added. The mixture is then stirred for 8 hours at 100°C, cooled to 20°C, and the precipitated dyestuff, which in one of the possible tautomeric forms is of the formula:

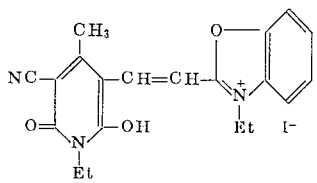

is filtered off, washed with ether and dried.

The dyestuff dyes nylon textile materials in yellow shades.

EXAMPLE 31

In place of the 4.34 parts of the ethiodide used in example 30 there are used 4.6 parts of 2-[4'-(N-acetyl-N-phenyl(amino)buta-$\Delta^{1:3}$-dienyl]benzoxazole ethiodide whereby there is obtained the dyestuff which, in one of the possible tautomeric forms, is of the formula:

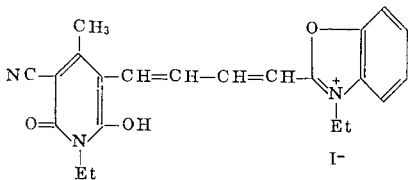

The dyestuff dyes nylon textile materials in greenish-blue shades by transmitted light and magenta by reflected light.

EXAMPLE 32

A mixture of 10 parts of 2:6-dihydroxy-3-carboethoxy-4-methylpyridine, 4.4 parts of β-ethoxyacrolein diethyl acetal and 30 parts of pyridine is stirred at the boil for 5 minutes. The mixture is cooled to 20°C, and the precipitated dyestuff which in one of the possible tautomeric forms, is of the formula:

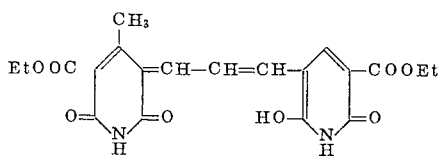

is filtered off, washed with pyridine then with ether and is dried.

The dyestuff dyes nylon textile materials in violet shades.

EXAMPLE 33

A mixture of 1.0 part of 1-butyl-3-carboxymethyl-5-(3'-ethoxyallylidene)-hexahydro-2:4:6-trioxopyrimidine, 0.58 part of N-ethyl-3-hydroxy-4-methyl-5-cyanopyrid-2-one, 12 parts of ethanol and 0.79 part of triethylamine is stirred at the boil for 30 minutes. The mixture is cooled to 20°C, acidified with acetic acid, and the precipitated dyestuff, which in one of the possible tautomeric forms is of the formula:

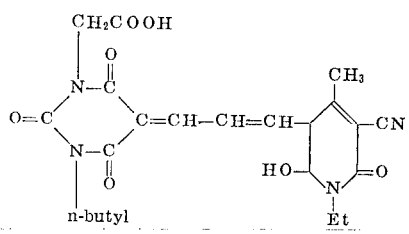

is filtered off, washed with ether and is dried.

When this dyestuff is incorporated into a gelatine coating by the method described in example 11, the coating has a maximum absorption at 500 μ. The coating is also substantially decolorized by treatment in any of the photographic solutions disclosed in example 11.

The N-(ethyl, β-hydroxyethyl, γ-methoxypropyl, phenyl, n-butyl, cyclohexyl, n-nonyl, benzyl and m-carbomethoxyphenyl) 2-hydroxy-4-methyl-5-cyanopyrid-6-ones used in the above examples were obtained by condensing together ethyl cyanoacetate and ethyl acetoacetate in the presence of respectively ethylamine, β-hydroxyethylamine, γ-methoxypropylamine, aniline, n-butylamine, cyclohexylamine, n-nonylamine, benzylamine and m-carbomethoxyaniline.

The 2:6-dihydroxy-4-methyl-5-cyanopyridine was obtained by the condensation of ethyl cyanoacetate, ethyl acetoacetate and ammonia.

N-ethyl-2-hydroxy-4-methyl-5-carbonamidopyrid-6-one was obtained by hydrolysis of the corresponding nitrile.

N-n-dodecyl-2-hydroxy-4-methyl-5-carbonamidopyrid-6-one was obtained by condensing together ethylcyanoacetate, ethyl acetoacetate and n-dodecylamine, and subsequently hydrolysing the cyano group to carbonamido.

2:6-dihydroxy-3-carboethoxy-4methylpyridine was obtained by reacting acetoacetamide with diethylmalonate in the presence of sodium ethoxide.

N-ethyl-2-hydroxy-4-(p-methoxyphenyl)-5-cyanopyrid-6one was obtained by condensing together ethyl p-methoxybenzoylacetate, ethylcyanoacetate and ethylamine.

I claim:

1. A dyestuff which, in one of the possible tautomeric forms, is represented by the formula:

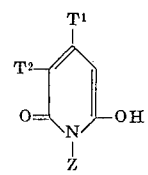

wherein X represents a group of the formula: E¹ or —CH = E² wherein E¹ is 5-pyrazolones, 5-aminopyrazoles, acylacetoarylamides, alkylcyanoacetates, alkyl acylacetates, malonodinitrile, dialkyl malonates, hydroxy pyridones of the formula:

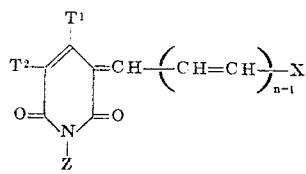

wherein $T^1$ and $T^2$ and Z are the above, or napthols;
$E^2$ is an oxazole, benzoxazole, thiazole and benzthiazole;
$n$ is 1, 2, or 3;
Z represents a hydrogen atom, lower alkyl, hydroxy lower alkyl, lower alkoxy lower alkyl, n-actyl, n-nonyl, n-decyl, n-dodecyl, cyanomethyl, carbamoylmethyl, carbethoxymethyl, acetylmethyl, benzyl, β-phenylethyl, cyclohexyl, phenyl, tolyl, chlorophenyl, methoxyphenyl, ethoxyphenyl, carbomethoxy, phenyl, 2-pyridyl, 2-thiazolyl, 1-piperdinyl, 1-morphinyl and amino;
$T^1$ represents a hydrogen atom or a hydroxy, —CN, —COOR$^1$, —CONR$^1$R$^2$ or COR$^1$ group or lower alkyl, hydroxy lower alkyl, lower alkoxy lower alkyl, benzyl, β-phenylethyl, phenyl, tolyl, chlorophenyl, methoxyphenyl, ethoxyphenyl, 2-pyridyl, 2-thiazoyl, 1-piperidinyl and 1-morpholinyl;
$T^2$ represents a hydrogen atom or a —CN, —COOR$^1$, —CONR$^1$R$^2$ or —COR$^1$ group or lower alkyl, hydroxy lower alkyl, lower alkoxy lower alkyl, benzyl, β-phenylethyl, phenyl, tolyl, chlorophenyl, methoxyphenyl, ethoxyphenyl, 2-pyridyl, 2-thiazole, 1-piperidinyl and 1-morpholinyl; and $R^1$ and $R^2$ each independently represent hydrogen, lower alkyl, hydroxy lower alkyl, lower alkoxy lower alkyl, benzyl, β-phenylethyl, cyclohexyl, phenyl, chlorophenyl, tolyl, methoxyphenyl, ethoxyphenyl, 2-pyridyl, 2-thiazolyl, 1-piperidinyl and 1-morpholinyl, or $R^1$ and $R^2$ together from with the nitrogen atom N a piperidine, morpholine, piperazine or pyrrolidine ring.

2. A dyestuff, as claimed in claim 1, which is of the formula:

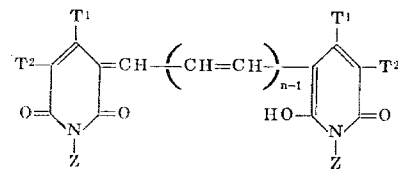

wherein Z is selected from the class consisting of hydrogen, lower alkyl, hydroxy lower alkyl, lower alkoxy lower alkyl, phenyl, cyclohexyl, benzyl and carbomethoxyphenyl;
$T^1$ is selected from the class consisting of hydrogen, lower alkyl, carboxy, phenyl and methoxyphenyl;
$T^2$ is selected from the class consisting of hydrogen, cyano, carbo lower alkoxy and carbonamido; and
$n$ is a positive integer of from 1 to 3.

* * * * *